US012598682B2

(12) United States Patent
Zhao et al.

(10) Patent No.: US 12,598,682 B2
(45) Date of Patent: Apr. 7, 2026

(54) DIMMING AND COLOR TEMPERATURE ADJUSTING CONTROL DEVICE

(71) Applicant: Zhuhai Shengchang Electronics Co., Ltd., Zhuhai City (CN)

(72) Inventors: Xianyun Zhao, Zhuhai City (CN); Dehua Zheng, Zhuhai City (CN)

(73) Assignee: Zhuhai Shengchang Electronics Co., Ltd., Zhuhai City (CN)

( * ) Notice: Subject to any disclaimer, the term of this patent is extended or adjusted under 35 U.S.C. 154(b) by 65 days.

(21) Appl. No.: 18/889,351

(22) Filed: Sep. 18, 2024

(65) Prior Publication Data

US 2026/0013016 A1 Jan. 8, 2026

(30) Foreign Application Priority Data

Jul. 4, 2024 (CN) ........................ 202410891378.9

(51) Int. Cl.

| | |
|---|---|
| ***H05B 45/10*** | (2020.01) |
| ***H05B 45/20*** | (2020.01) |
| ***H05B 45/31*** | (2020.01) |
| ***H05B 45/325*** | (2020.01) |
| ***H05B 47/00*** | (2020.01) |
| ***H05B 47/19*** | (2020.01) |

(52) U.S. Cl.

CPC ........... *H05B 45/325* (2020.01); *H05B 45/10* (2020.01); *H05B 45/20* (2020.01); *H05B 45/31* (2020.01); *H05B 47/19* (2020.01)

(58) Field of Classification Search

CPC ........ H05B 45/10; H05B 45/20; H05B 45/31; H05B 45/3577; H05B 47/00; H05B 47/17; H05B 47/19; H05B 47/185

See application file for complete search history.

(56) References Cited

U.S. PATENT DOCUMENTS

2014/0265880 A1* 9/2014 Taipale ................. H05B 47/11 315/246
2022/0201820 A1* 6/2022 Kumar .............. H05B 45/3577

(Continued)

FOREIGN PATENT DOCUMENTS

CN 117896883 A 4/2024

*Primary Examiner* — Thai Pham

(74) *Attorney, Agent, or Firm* — Rondaus PLLC; George Liu

(57) ABSTRACT

The present disclosure discloses a dimming and color temperature adjusting control device, includes a housing, and a zero-crossing detection circuit, a control circuit, a carrier phase-cutting circuit and a power supply circuit arranged on a control circuit board in the housing, where the housing is provided with a control panel, and the control panel is provided with a color temperature operation module and a brightness operation module. The zero-crossing detection circuit is used for detecting a zero-crossing point position of mains. The control circuit is used for calculating a chopping position according to a brightness adjustment amount and the zero-crossing point position, and encoding a color temperature adjustment amount to generate a color temperature encoding signal. The carrier phase-cutting circuit is used for chopping mains according to the chopping position to generate a phase-cut dimming signal and carrying the color temperature encoding signal on the phase-cut dimming signal.

8 Claims, 4 Drawing Sheets

(56) References Cited

U.S. PATENT DOCUMENTS

| | | | | |
|---|---|---|---|---|
| 2023/0189409 A1* | 6/2023 | Xiong | ...................... | H04B 3/54 |
| | | | | 315/294 |
| 2024/0155751 A1* | 5/2024 | Baker | .................. | H05B 47/196 |
| 2025/0142697 A1* | 5/2025 | Archer | ................. | H05B 45/325 |
| 2025/0294660 A1* | 9/2025 | Fang | ...................... | H05B 45/20 |

* cited by examiner

DIMMING AND COLOR TEMPERATURE ADJUSTING CONTROL DEVICE

TECHNICAL FIELD

The present disclosure relates to the field of dimming technology, and in particular to a dimming and color temperature adjusting control method and device.

BACKGROUND

As people's living standards improve, people have higher requirements for light sources and more diverse demands for light color temperature. In old buildings, since only power supply lines for lighting fixtures are pre-embedded, additional dimming lines need to be laid to achieve the adjustment of light color temperature, which makes the installation and wiring complicated and the reconstruction cost high. In order to adjust the color temperature or brightness of the light without laying additional dimming lines, some products on the market adopt power line communication technology to encode the dimming or color temperature signals and load them onto the mains. However, the current dimming controllers using power line communication technology can only carry dimming or color adjusting information on the mains at a time, resulting in slow response speed and inconvenience in use.

SUMMARY

In order to overcome the shortcomings of the prior art, the object of the present disclosure is to provide a dimming and color temperature adjusting control device that can adjust the brightness and color temperature of the light without laying additional dimming circuits, and can simultaneously transmit dimming and color adjustment information to the dimming power supply or light source, achieving fast dimming response speed.

In order to solve the above problems, the technical solution adopted by the present disclosure is as follows: a dimming and color temperature adjusting control device, comprising a housing, a control panel, and a control circuit board; the control circuit board is arranged in the housing, and the control circuit board is provided with a zero-crossing detection circuit, a control circuit, a carrier phase-cutting circuit and a power supply circuit; the zero-crossing detection circuit is used for detecting a zero-crossing point position of mains; the control circuit is electrically connected to an output end of the zero-crossing detection circuit and is used for calculating a chopping position according to a brightness adjustment amount and the zero-crossing point position, and encoding a color temperature adjustment amount to generate a color temperature encoding signal; the carrier phase-cutting circuit is electrically connected to an output end of the control circuit and is used for chopping mains according to the chopping position to generate a phase-cut dimming signal, and carrying the color temperature encoding signal on the phase-cut dimming signal; the power supply circuit is used for supplying power to the zero-crossing detection circuit, the control circuit and the carrier phase-cutting circuit; the control panel is arranged on the housing, and the control panel is provided with a brightness operation module and a color temperature operation module; the brightness operation module is electrically connected to the control circuit and is used for inputting the brightness adjustment amount; and the color temperature operation module is electrically connected to the control circuit and is used for inputting the color temperature adjustment amount.

Compared with the prior art, the beneficial effect of the present disclosure is that the brightness of the lamp is adjusted in a phase-cutting dimming method, and the color temperature encoding signal generated by encoding the color temperature adjustment amount is carried on the phase-cut dimming signal, so that the brightness and the color temperature of the light can be adjusted only by using the power supply line of the lamp. The information of the brightness adjustment amount is represented by the conduction period length of the phase-cut dimming signal, the information of the color temperature adjustment amount is represented by the color temperature encoding signal carried on the phase-cut dimming signal, the two pieces of information can be carried on the phase-cut dimming signal at the same time, are easy to distinguish, do not interfere with each other, can realize simultaneous adjustment of brightness and color temperature, is fast in adjustment response, and can improve user experience.

In the above-mentioned dimming and color temperature adjusting control device, the control circuit board is further provided with a brightness signal processing circuit and a color temperature signal processing circuit, the brightness operation module is electrically connected to the control circuit by means of the brightness signal processing circuit, and the color temperature operation module is electrically connected to the control circuit by means of the color temperature signal processing circuit; the brightness signal processing circuit is used for receiving a brightness adjustment signal output by the brightness operation module, and converting the brightness adjustment signal into a corresponding brightness control voltage and outputting the brightness control voltage to the control circuit; and the color temperature operation module is used for receiving a color temperature adjustment signal output by the color temperature operation module, and converting the color temperature adjustment signal into a corresponding color temperature control voltage and outputting the color temperature control voltage to the control circuit.

In the above-mentioned dimming and color temperature adjusting control device, an input end of the control circuit board is a single live wire input, and a single live wire input end is connected to mains live wire; and an output end of the control circuit board is single-wire output, a single-wire output end is connected with one input end of a phase-cut dimming power supply, and another input end of the phase-cut dimming power supply is connected to an neutral line of the mains to form a current loop.

In the above-mentioned dimming and color temperature adjusting control device, both the brightness operation module and the color temperature operation module are arranged to be a potentiometer, a touch screen, an encoder, or a key control board.

In the above-mentioned dimming and color temperature adjusting control device, the control circuit board further includes a peripheral circuit, the peripheral circuit is electrically connected to the control circuit, the peripheral circuit is used for setting and adjusting a lowest brightness level and switching between a leading edge phase-cut and a trailing edge phase-cut, and the peripheral circuit is arranged to be composed of the potentiometer, a Dual In-line Package (DIP) switch or an Near Field Communication (NFC) circuit.

The above-mentioned dimming and color temperature adjusting control device further comprising a wireless communication circuit, the wireless communication circuit is electrically connected to the control circuit, and the wireless communication circuit is used for wirelessly controlling the control circuit.

In the above-mentioned dimming and color temperature adjusting control device, the carrier phase-cutting circuit carries the color temperature encoding signal on a start section or an end section of the phase-cut dimming signal.

In the above-mentioned dimming and color temperature adjusting control device, the control panel is further provided with a switch module, a switch of the switch module is connected in series between the mains and the control circuit board to control a connection and disconnection of the mains and the control circuit board, or the switch module is electrically connected to the power supply circuit and/or the control circuit, so that the dimming and color temperature adjusting control device is in a standby or normal working state.

A dimming and color temperature adjusting control method, comprising the following steps:

- acquiring a brightness adjustment amount and a color temperature adjustment amount;
- encoding the color temperature adjustment amount according to a preset encoding rule to form a color temperature encoding signal;
- calculating a chopping position according to the brightness adjustment amount and the zero-crossing point position of the mains;
- chopping mains according to the chopping position to generate a phase-cut dimming signal; and
- carrying the color temperature encoding signal on the phase-cut dimming signal.

In the above-mentioned dimming and color temperature adjusting control method, in the step of carrying the color temperature encoding signal on the phase-cut dimming signal, the color temperature coding signal is carried on a start section or an end section of the phase-cut dimming signal.

The present disclosure will be further described in detail below in conjunction with the accompanying drawings and specific embodiments.

EXPLANATION OF REFERENCE NUMBERS

100 housing, 200 control panel, 210 brightness operation module, 220 color temperature operation module, 230 switch module, and 300 control circuit board.

DETAILED DESCRIPTION OF THE EMBODIMENTS

Figure 1:
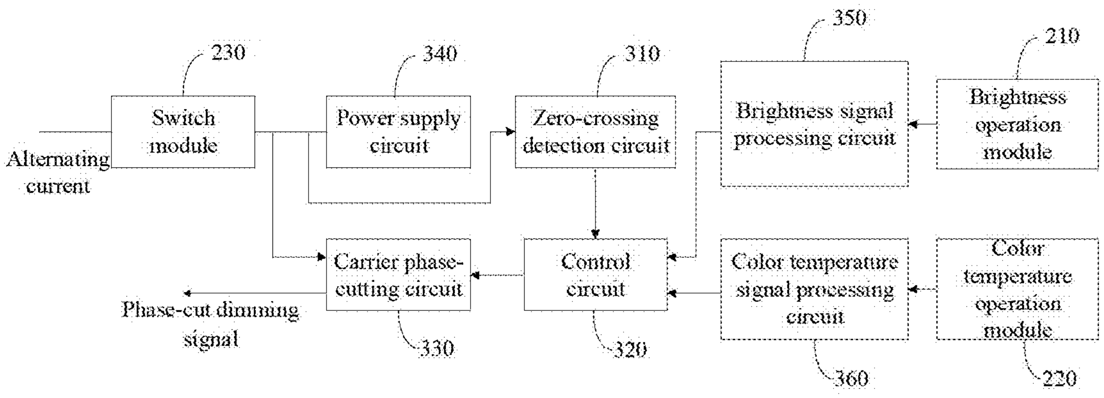
FIG. 1 is a functional block diagram of a dimming and color temperature adjusting control device according to a first embodiment of the present disclosure.
Figure 2:
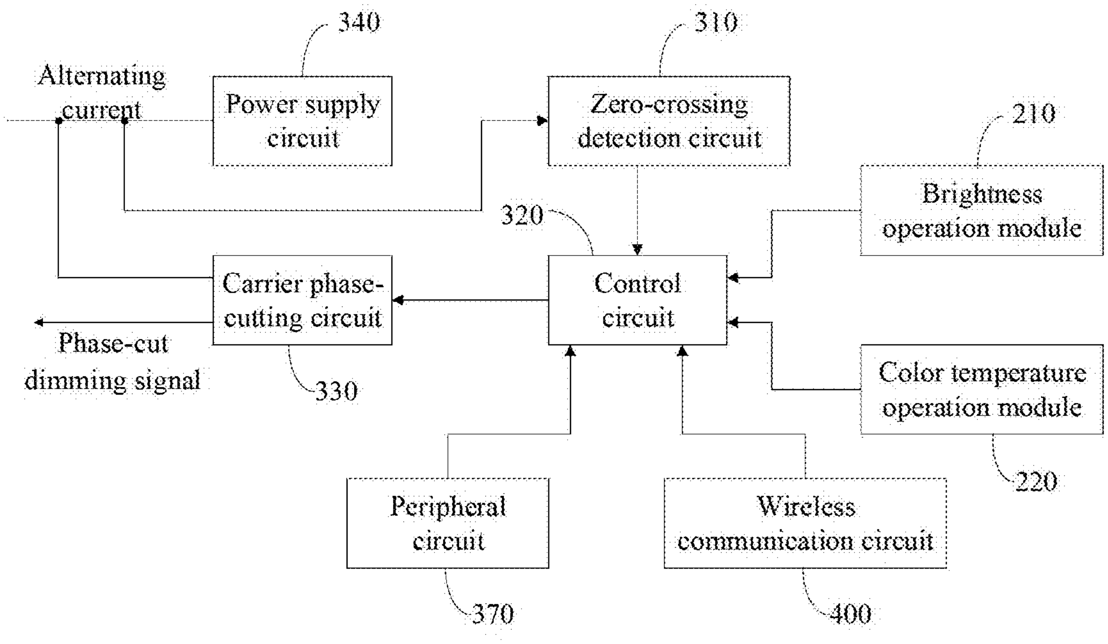
FIG. 2 is a functional block diagram of a dimming and color temperature adjusting control device according to a second embodiment of the present disclosure.
Figure 5:
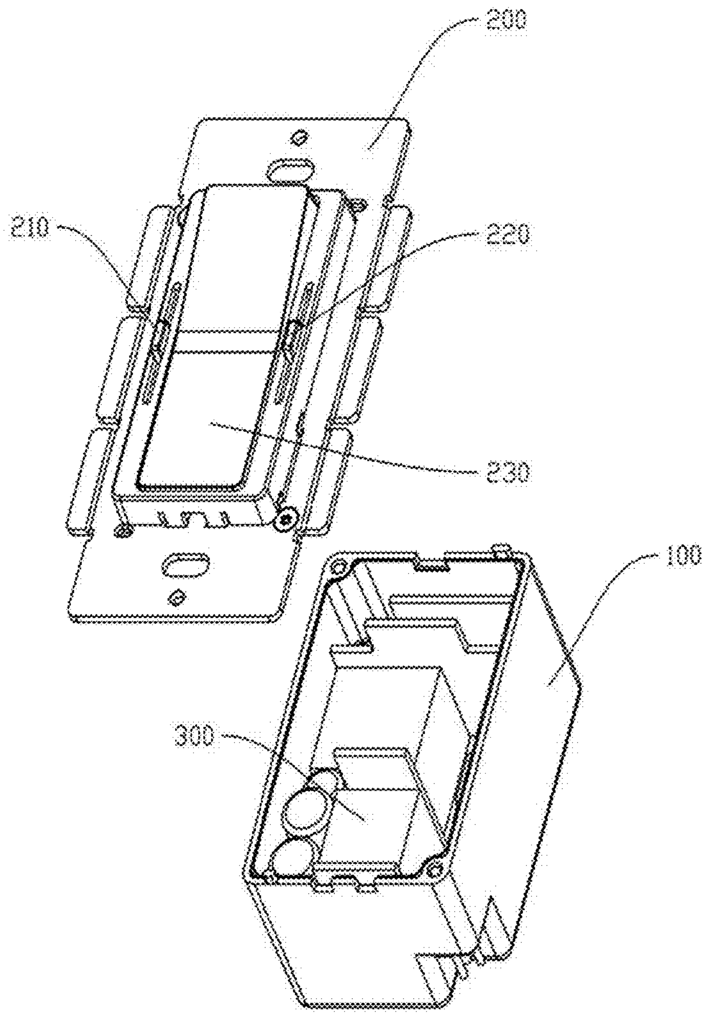
FIG. 5 is a schematic structural diagram of a dimming and color temperature adjusting control device according to a first embodiment of the present disclosure.

The embodiments of the present disclosure are described in detail below. With reference to FIGS. 1, 2 and 5, the embodiments of the present disclosure provide a dimming and color temperature adjusting control device, including a zero-crossing detection circuit 310, a control circuit 320, a carrier phase-cutting circuit 330 and a power supply circuit 340, a control panel 200 and a housing 100. The zero-crossing detection circuit 310, the control circuit 320, the carrier phase-cutting circuit 330, and the power supply circuit 340 are all arranged on a control circuit board 300 in the housing 100. Input ends of the zero-crossing detection circuit 310 and the carrier phase-cutting circuit 330 are connected to mains, and the zero-crossing detection circuit 310 is used for detecting a zero-crossing point position of the alternating current. The control circuit 320 is used for calculating a conduction period length of the phase-cut dimming signal based on a brightness adjustment amount, and calculating a chopping position based on the calculated conduction period length and the zero-crossing point position detected by the zero-crossing detection circuit 310. At the same time, the control circuit 320 also encodes a color temperature adjustment amount to generate a color temperature encoding signal. The carrier phase-cutting circuit 330 is used for performing chopping on the half-wave of the input alternating current according to the chopping position calculated by the control circuit 320, generating a phase-cut dimming signal corresponding to the conduction period length and the brightness adjustment amount, and carrying the color temperature encoding signal on the phase-cut dimming signal. An input end of the power supply circuit 340 is connected to the alternating current, and is used for supplying power to a normal operation of the entire control device. The control panel 200 is provided with a color temperature operation module 220 and a brightness operation module 210, and the color temperature operation module 220 and the brightness operation module 210 are both connected to the control circuit 320, and are respectively used for inputting the color temperature adjustment amount and the brightness adjustment amount to the control circuit 320.

According to the dimming and color temperature adjusting control device of the embodiment of the present disclosure, the lamp is dimmed by using the phase-cut dimming signal carrying the color temperature encoding signal, and the phase-cut dimming signal can be transmitted to the light source through the existing power supply line, so that the brightness and the color temperature of the lamp can be adjusted without additionally arranging a dimming line, and the dimming and color temperature adjusting control device is suitable for dimming renovation of the lighting circuit in old houses. Meanwhile, the brightness adjustment amount is carried by the conduction period length of the phase-cut dimming signal, and the phase-cut dimming signal can carry the color temperature adjustment amount at the same time by carrying the color temperature encoding signal, so that the brightness and the color temperature can be adjusted at the same time, the dimming response speed is high, and the use experience can be improved. Meanwhile, since the color temperature encoding signal is usually a pulse with a short conduction period, the impact on the length of the conduction period of the phase-cut dimming signal after carrying the color temperature encoding signal is negligible, and the brightness and color temperature dimming information carried by the phase-cut dimming signal are easy to distinguish, which is not easy to interfere with each other, and can more stably realize the precise adjustment of the brightness and color temperature of the lamp. Furthermore, with the dimming and color temperature adjusting control device according to the embodiment of the present disclosure, only the color temperature adjustment amount needs to be encoded, and compared with an existing dimming controller using power carrier communication for encoding both brightness and color temperature adjustment information, the control is simpler, the number of encoding circuits is reduced, and both the research and development and implementation costs are lower.

It can be understood that the brightness operation module 210 and the color temperature operation module 220 may use a potentiometer or an encoder to input the brightness adjustment amount and the color temperature adjustment amount. Referring to FIGS. 1 and 5, in some embodiments, the control circuit board 300 is further provided with a brightness signal processing circuit 350 and a color temperature signal processing circuit 360. An input end of the brightness signal processing circuit 350 is connected to one end and a leading-out end of the brightness operation module 210, and an output end of the brightness signal processing circuit 350 is electrically connected to the control circuit 320, and is used for converting the brightness adjustment signal output by the brightness operation module 210 into a brightness control voltage that can be received by the control circuit 320. An input end of the color temperature signal processing circuit 360 is connected to one end and a leading-out end of the color temperature operation module 220, and an output end of the color temperature signal processing circuit 360 is electrically connected to the control circuit 320, and is used for converting the color temperature adjustment signal output by the color temperature operation module 220 into a color temperature control voltage that can be received by the control circuit 320. The control circuit 320 obtains the brightness adjustment amount and the color temperature adjustment amount according to the brightness control voltage and the voltage value of the color temperature control voltage. The brightness signal processing circuit 350 and the color temperature signal processing circuit 360 may generally adopt a voltage conversion circuit such as an amplifying circuit or a voltage stabilizing circuit, and the specific structure thereof is common general knowledge in the art and will not be described in detail here.

It can be understood that, referring to FIG. 2, the brightness operation module 210 and the color temperature operation module 220 may also be a touch screen or a key control board, and the brightness adjustment amount and the color temperature adjustment amount are directly input to the control circuit 320 according to the position of the sliding strip on the touch screen or via the key control board.

It can be understood that in some embodiments, the brightness adjustment amount and the color temperature adjustment amount may also be transmitted to the control circuit 320 in a wireless communication method. Referring to FIG. 2, in some embodiments, the control circuit board 300 further includes a wireless communication circuit 400, and an output end of the wireless communication circuit 400 is electrically connected to the control circuit 320. The wireless communication circuit 400 may be a Bluetooth unit or a Wi-Fi unit and a peripheral circuit 370 thereof, etc. The APP is installed on an intelligent terminal such as a mobile phone, and the APP controls the mobile phone to transmit the brightness adjustment amount and the color temperature adjustment amount to the wireless communication circuit 400, or directly transmit the brightness adjustment amount and the color temperature adjustment amount to the Wi-Fi unit through the Wi-Fi signal to implement transmission of the dimming information.

It can be understood that in some embodiments, the control circuit board further includes a peripheral circuit 370, an output end of the peripheral circuit 370 is electrically connected to the control circuit 320, and the peripheral circuit 370 can be used for adjusting the lowest brightness level, the minimum phase width, the maximum phase width, as well as switching between the leading edge phase-cut mode and the trailing edge phase-cut mode, among other functions. Peripheral circuits can use potentiometers, DIP switches or NFC circuits. If an NFC receiving circuit is used, the control panel 200 should be provided with an NFC sensing area, and the receiving coil of the NFC receiving circuit should be located close to the NFC sensing area on the control panel 200.

It can be understood that in some embodiments, a switch module 230 is further arranged on the control panel 200, the switch module 230 is used for controlling the working state of the whole control device, a switch in the switch module 230 can be arranged between the mains and the input end of the control circuit board 300, and the power supply of the whole control device is controlled by cutting off or conducting connection between the control circuit board 300 and the mains so as to open or close the control device. Or the switch in the switch module 230 is connected to the control circuit 320 and/or the power supply circuit 340, and the whole control device is controlled to switch between a low power consumption standby mode and a normal working mode by directly or indirectly controlling a control signal of the power supply circuit 340. The switch module 230 may use a mechanical switch or a touch screen.

It can be understood that, in order to simplify installation, in some embodiments, the input end and the output of the control circuit board 300 respectively use single live wire input and single-wire output, that is, the input ends of the power supply circuit 340, the zero-crossing detection circuit 310 and the carrier phase-cut circuit are only connected to the live wire of the mains, the output end of the carrier phase-cutting circuit 330 is connected to the live wire end of the input end of the Phase-cut dimming power supply 500, and the neutral line end of the input end of the Phase-cut dimming power supply 500 is connected to the neutral line of the mains to form a closed-loop.

It can be understood that the control circuit 320 generally includes microcontroller and peripheral circuit 370 thereof. The microcontroller can generate a corresponding color temperature and brightness modulation signal according to the input color temperature adjustment amount and the brightness adjustment amount, and the modulation signal is generally a pulse signal to control the switch of the carrier phase-cutting circuit 330. The specific structure of the color temperature encoding modulation signal needs to be designed according to the encoding rule of the color temperature adjustment amount and the form of the modulation signal. The specific structures of the above circuit and the zero-crossing detection circuit 310 are common general knowledge in the art, and details are not described herein.

Figure 3:
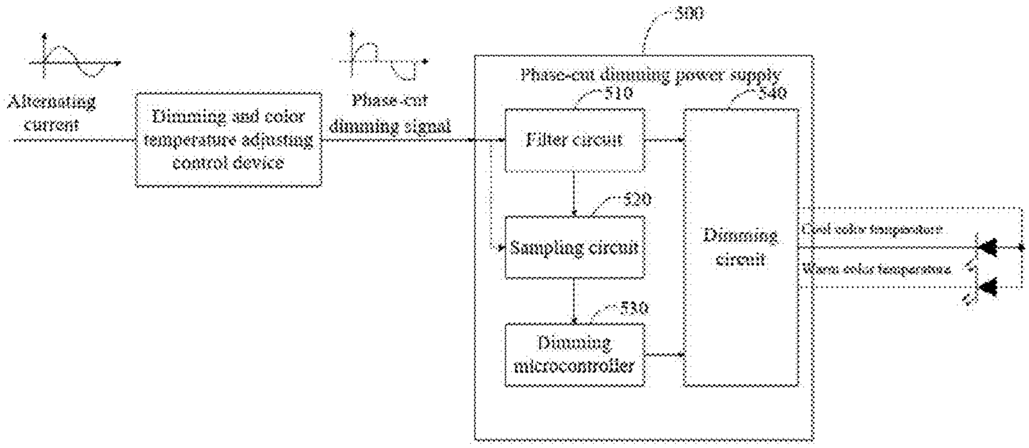
FIG. 3 is a functional block diagram of a brightness and color temperature adjustable light source according to an embodiment of the present disclosure.

Referring to FIG. 3, the Phase-cut dimming power supply 500 matched with the embodiment of the present disclosure includes a sampling circuit 520, a dimming microcontroller 530 and a dimming circuit 540. The input end of the sampling circuit 520 and the input end of the dimming circuit 540 are both connected to the phase-cut dimming signal output by the dimming and color temperature adjusting control device, the output end of the sampling circuit 520 is electrically connected to the dimming microcontroller 530, the output end of the dimming circuit 540 is connected to the light source load, and the dimming circuit 540 is controlled by the dimming microcontroller 530. The sampling circuit 520 samples and adjusts the input phase-cut dimming signal and transmits the phase-cut dimming signal to the dimming microcontroller 530, the dimming microcontroller 530 analyzes the sampling signal to obtain brightness and color temperature data, and then the dimming circuit 540 is controlled to output the energy of the lamp with different color temperatures according to the obtained brightness and color temperature data so as to realize adjustment of the color temperature and brightness. Referring to FIG. 3, the input end of the dimming circuit 540 is connected to the phase-cut dimming signal through a filter circuit 510, and the filter circuit 510 can filter out the electromagnetic interference signal in the phase-cut dimming signal, so that the operation of the dimming circuit 540 is more stable. It can be understood that the dimming circuit 540 generally includes a switching power supply and two or more output control circuits. Each output control circuit 320 is connected to a color temperature lamp. Under the control of the dimming microcontroller 530, the output control circuit 320 adjusts the brightness ratio between the two or more lamps with different color temperatures, so that the lamplight mixed by the lamplight emitted by the lamps with different color temperatures can show different color temperatures.

Figure 6:
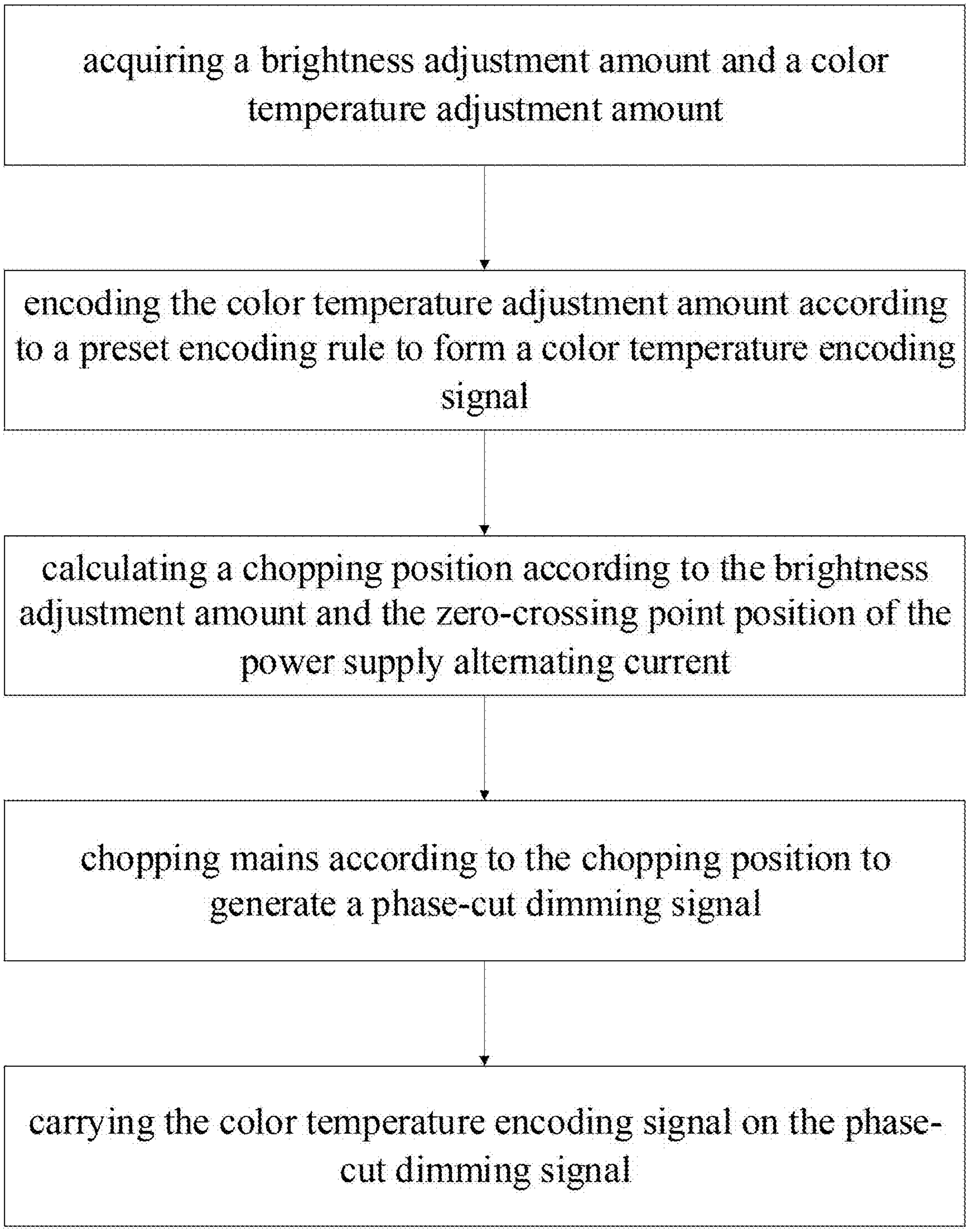
FIG. 6 is a flow chart of a dimming and color temperature adjusting control method according to an embodiment of the present disclosure.

Referring to FIG. 6, a dimming and color temperature adjusting control method according to the embodiment of the present disclosure includes the following steps:

acquiring a brightness adjustment amount and a color temperature adjustment amount;

encoding the color temperature adjustment amount according to a preset encoding rule to form a color temperature encoding signal;

calculating a chopping position according to the brightness adjustment amount and the zero-crossing point position of the mains;

chopping mains according to the chopping position to generate a phase-cut dimming signal; and carrying the color temperature encoding signal on the phase-cut dimming signal.

Figure 4:
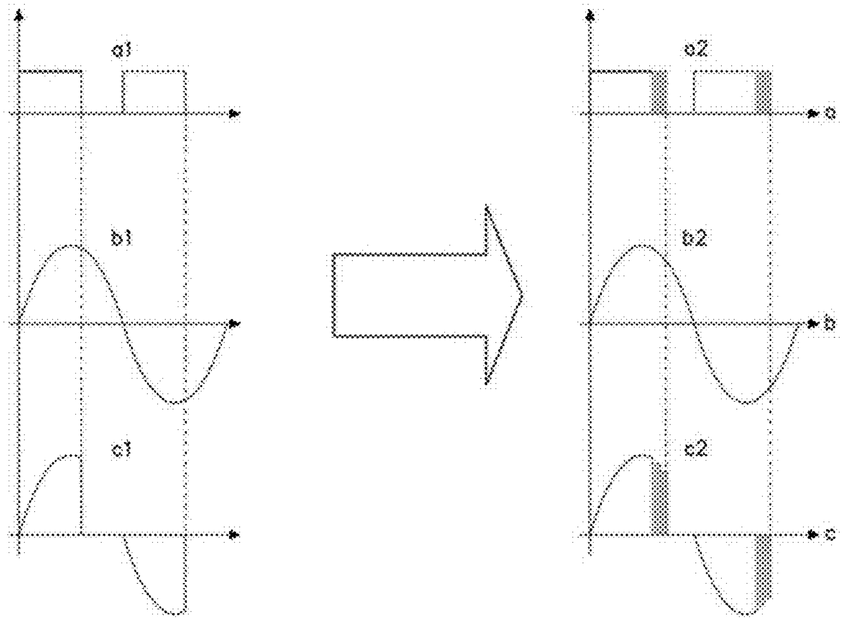
FIG. 4 is a waveform diagram of a phase-cut dimming signal according to an embodiment of the present disclosure.

Referring to FIG. 4, in this embodiment, the color temperature encoding signal is a square wave signal, and when the color temperature encoding signal is carried to the phase-cut dimming signal, the alternating current is modulated by using the color temperature encoding signal, the high level segment of the color temperature encoding signal maintains the original waveform of the alternating current, and the waveform of the low level segment is chopped. The specific information can be represented by the duration of each pulse in the color temperature encoding section in the phase-cut dimming signal; or the chopped part is used as the symbol "1", the unchopped part is used as the symbol "0", and the color temperature adjustment information is conveyed through the binary string. In order to facilitate the identification and decoding of the color temperature encoding section of the phase-cut dimming signal, each color temperature encoding section can be divided into a start mark segment, a data segment, an end mark segment and a check bit segment, and the start mark segment and the end mark segment can be pulses of a specific length or a specific number of symbols. The data segment and the check bit segment can be arranged in a certain order using "0" symbol and "1" symbol to form a binary encoding of the character's ASICC code value, so as to express the color temperature adjustment amount and the check code calculated based on the color temperature adjustment amount. The check code is used for checking whether the color temperature adjustment amount contained in the data segment is accurate according to a specific verification rule, thereby avoiding inaccurate color temperature adjustment due to unexpected situations such as error recognition or decoding errors. The data segment can also be programmed with time, number and other information to assist in realizing more complex color temperature adjustment control such as one-to-many. Specific encoding rules are designed by technical personnel based on actual needs and will not be expanded upon here.

It can be understood that the phase-cut dimming method can adopt leading-edge phase-cut dimming or trailing-edge phase-cut dimming. The color temperature encoding signal can be inserted at any position in the front, middle or rear section of the phase-cut dimming signal as needed. Referring to FIG. 4, in this embodiment, in order to facilitate identification of the color temperature encoding section in a phase-cut dimming signal, the color temperature encoding signal is preferably carried on a starting section or an ending section of the phase-cut dimming signal generated according to a brightness dimming value, that is, a start position or an end position of each half-wave, or two sides of a chopping position. Referring to FIG. 4, during the process of generating the phase-cut dimming signal, the chopping modulation signal a1 generated according to the calculated chopping position and the color temperature coding modulation signal generated by encoding the color temperature adjustment amount can be superimposed to generate the final modulation signal a2, and then the final modulation signal a2 is used for modulating the alternating current to directly generate a final phase-cut dimming signal carrying the color temperature encoding signal; or the chopping modulation signal a1 and the color temperature encoding modulation signal are firstly used for modulating the alternating current, and then the two modulation signals are superimposed on the alternating current modulation result to generate the final phase-cut dimming signal carrying the color temperature encoding signal.

It can be understood that the color temperature encoding signal can be continuously carried on the phase-cut dimming signal to be output so as to continuously transmit color temperature information to the lamp; and the color temperature encoding signal can be carried on one or a finite number of cycles on the phase-cut dimming signal only when the color temperature adjustment amount is changed each time.

It should be noted that, in the description of the present disclosure, any references to orientation, such as "up", "down", "front", "back", "left", "right", etc., are based on the orientation or positional relationships depicted in the accompanying drawings. These references are solely for the convenience of describing the present disclosure and simplifying the description. They do not indicate or imply that the device or element referred must have a specific orientation, be constructed or operated in a particular orientation, and should not be construed as a limitation of the present disclosure.

In the description of the present disclosure, "a plurality of" shall refer to one or more, "multiple" shall refer to two or more, and expressions such as "greater than," "less than," "exceed," etc., shall be understood as excluding the stated number. Expressions such as "above," "below," "within," etc., shall be understood as including the stated number. If references to "first" or "second" are made, they are merely for the purpose of distinguishing technical features, and should not be understood to indicate or imply relative importance, or implicitly specify the number of technical features being referred to, or imply any order of precedence among the technical features.

In the description of the present disclosure, unless otherwise explicitly limited, words such as “provided with”, “install”, and “connect” should be understood in a broad sense. Those skilled in the art can reasonably determine the specific meaning of the above words in the present disclosure in combination with the specific content of the technical solution.

The above-mentioned embodiments are only preferred embodiments of the present disclosure and cannot be used to limit the scope of protection of the present disclosure. Any non-substantive changes and substitutions made by those skilled in the art on the basis of the present disclosure shall belong to the scope of protection claimed by the present disclosure.

What is claimed is:

1. A dimming and color temperature adjusting control device, comprising a housing, a control panel, and a control circuit board;

the control circuit board is arranged in the housing, and the control circuit board is provided with a zero-crossing detection circuit, a control circuit, a carrier phase-cutting circuit and a power supply circuit;

the zero-crossing detection circuit is used for detecting a zero-crossing point position of mains;

the control circuit is electrically connected to an output end of the zero-crossing detection circuit and is used for calculating a chopping position according to a brightness adjustment amount and the zero-crossing point position, and encoding a color temperature adjustment amount to generate a color temperature encoding signal;

the carrier phase-cutting circuit is electrically connected to an output end of the control circuit and is used for chopping mains according to the chopping position to generate a phase-cut dimming signal, and carrying the color temperature encoding signal on the phase-cut dimming signal;

the power supply circuit is used for supplying power to the zero-crossing detection circuit, the control circuit and the carrier phase-cutting circuit;

the control panel is arranged on the housing, and the control panel is provided with a brightness operation module and a color temperature operation module;

the brightness operation module is electrically connected to the control circuit and is used for inputting the brightness adjustment amount; and the color temperature operation module is electrically connected to the control circuit and is used for inputting the color temperature adjustment amount.

2. The dimming and color temperature adjusting control device according to claim 1, wherein the control circuit board is further provided with a brightness signal processing circuit and a color temperature signal processing circuit, the brightness operation module is electrically connected to the control circuit by means of the brightness signal processing circuit, and the color temperature operation module is electrically connected to the control circuit by means of the color temperature signal processing circuit; the brightness signal processing circuit is used for receiving a brightness adjustment signal output by the brightness operation module, and converting the brightness adjustment signal into a corresponding brightness control voltage and outputting the brightness control voltage to the control circuit; and the color temperature operation module is used for receiving a color temperature adjustment signal output by the color temperature operation module, and converting the color temperature adjustment signal into a corresponding color temperature control voltage and outputting the color temperature control voltage to the control circuit.

3. The dimming and color temperature adjusting control device according to claim 1, wherein an input end of the control circuit board is a single live wire input, and a single live wire input end is connected to mains live wire; and an output end of the control circuit board is single-wire output, a single-wire output end is connected with one input end of a phase-cut dimming power supply, and another input end of the phase-cut dimming power supply is connected to an neutral line of the mains to form a current loop.

4. The dimming and color temperature adjusting control device according to claim 1, wherein both the brightness operation module and the color temperature operation module are arranged to be a potentiometer, a touch screen, an encoder, or a key control board.

5. The dimming and color temperature adjusting control device according to claim 1, wherein the control circuit board further includes a peripheral circuit, the peripheral circuit is electrically connected to the control circuit, the peripheral circuit is used for setting and adjusting a lowest brightness level and switching between a leading edge phase-cut and a trailing edge phase-cut, and the peripheral circuit is arranged to be composed of the potentiometer, a Dual In-line Package (DIP) switch or an Near Field Communication (NFC) circuit.

6. The dimming and color temperature adjusting control device according to claim 1, further comprising a wireless communication circuit, the wireless communication circuit is electrically connected to the control circuit, and the wireless communication circuit is used for wirelessly controlling the control circuit.

7. The dimming and color temperature adjusting control device according to claim 1, wherein the carrier phase-cutting circuit carries the color temperature encoding signal on a start section or an end section of the phase-cut dimming signal.

8. The dimming and color temperature adjusting control device according to claim 1, wherein the control panel is further provided with a switch module, a switch of the switch module is connected in series between the mains and the control circuit board to control a connection and disconnection of the mains and the control circuit board, or the switch module is electrically connected to the power supply circuit and/or the control circuit, so that the dimming and color temperature adjusting control device is in a standby or normal working state.

* * * * *